MAGNETIC AMPLIFIER CIRCUIT

Filed Nov. 7, 1960 2 Sheets-Sheet 1

INVENTORS
ROBERT B. SHORT
HARRY R. LORD
BY Paul D. Carmichael
ATTORNEY

Feb. 25, 1964 R. B. SHORT ETAL 3,122,701

MAGNETIC AMPLIFIER CIRCUIT

Filed Nov. 7, 1960 2 Sheets-Sheet 2

United States Patent Office 3,122,701
Patented Feb. 25, 1964

3,122,701

MAGNETIC AMPLIFIER CIRCUIT

Robert B. Short and Harry R. Lord, Endicott, N.Y., assignors to International Business Machines Corporation, New York, N.Y., a corporation of New York Filed Nov. 7, 1960, Ser. No. 67,609
19 Claims. (Cl. 323—89)

Figure 1:
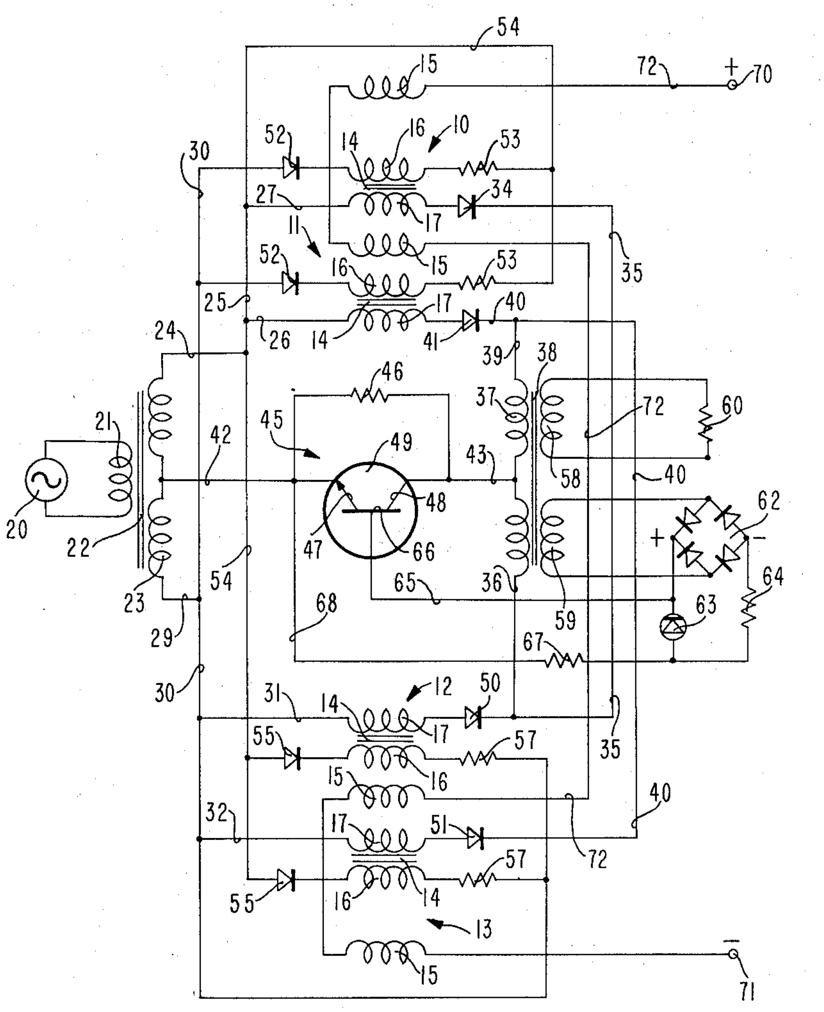

The present invention relates generally to magnetic amplifier systems and more particularly to circuit means for greatly improving the efficiency of operation of magnetic amplifiers. The term magnetic amplifier has often been used interchangeably with the terms saturable reactor, transductor and the like, but it is now generally recognized that the same are parts of magnetic amplifiers either alone or when connected in combination with other circuit elements to obtain amplification or control.

A magnetic amplifier is essentially a device which controls the alternating current reactance of a coil by controlling the effective permeability of the magnetic material upon which the coil is wound. A magnetic amplifier may comprise a core having a control winding, a gate winding and a bias winding. A load circuit is connected to the gate winding, while a source of alternating current supply voltage is connected through suitable rectifier means to the bias and gate windings of the magnetic amplifier. A control circuit is connected to the control winding for supplying a relatively small amount of current thereto. The amount and polarity of the current transmitted to the control winding determine the point during the alternating current power cycle of the supply voltage that the core saturates. An unsaturated core has a relatively high impedance to alternating currents while a saturated core acts effectively as an air core with practically no impedance except for the ohmic resistance of the gate winding.

It is well known in the art to connect magnetic amplifiers in various push-pull relationships. In one such arrangement, the current flowing through the gate windings of a pair of magnetic amplifiers during half cycles of one polarity of the supply voltage is conducted in opposite directions through a center-tapped primary winding of a load transformer. A second pair of magnetic amplifiers is provided for conducting currents in opposite directions through the center-tapped primary winding of the load transformer during half cycles of the other polarity of the supply voltage. In this manner a load, which is connected to a secondary of the load transformer, may be energized during both positive and negative half cycles of the supply voltage.

The core of each of the magnetic amplifiers is initially biased by current supplied to the bias winding whereby, in the absence of a control signal, the core will saturate when the supply voltage is positive with respect thereto and is at a predetermined value. Thus, for a periodically varying supply voltage, the cores of one pair of magnetic amplifiers will normally be biased to saturate half way through the positive half cycle of the supply voltage, and relatively large currents will flow in opposite directions through the primary winding of the load transformer until the supply voltage swings negative. The cores of the other pair of magnetic amplifiers will normally be biased to saturate when the maximum of the negative half cycle is reached, and relatively large currents will flow in the primary winding of the load transformer until the supply voltage again swings positive. Equal currents will be conducted in opposite directions through portions of the center-tapped primary winding of the load transformer, and the load will not be energized.

If now a control signal of sufficient magnitude is impressed across the control windings of these magnetic amplifiers, then the core of one magnetic amplifier associated with each of the pairs thereof will saturate a predetermined time prior to the saturation of the core of the other magnetic amplifier in the pair. The current flowing through the center-tapped primary winding of the load transformer will energize the load.

The above described circuit arrangement has been widely employed but is subject to a serious limitation that large quiescent currents flow when the cores are saturated and when no control signal is impressed on the control windings. The magnitude of these quiescent currents is limited only by the internal resistances of the gate windings and the primary winding of the load transformer. These excessive currents result in very high power losses and objectionable heating.

In order to mitigate the above limitation, it has been suggested to connect a relatively high impedance in the circuits for the quiescent currents to reduce the magnitude of the same. While this does limit the quiescent currents, it also has an adverse effect on the amount of power transmitted by the magnetic circuit to the load. When the load is energized due to the presence of a control signal, the impedance of the transformer coupled load is reflected into the circuits for the currents flowing through the gate windings of the magnetic amplifiers. A substantial voltage drop takes place across the high impedance provided to limit quiescent currents, thereby reducing the voltage drop across the reflected impedance of the load. The over-all operating efficiency of magnetic amplifier circuits prior to the present invention has been quite low. Efficiencies of less than fifty percent are common when a current limiting impedance is selected to provide a balance between the opposed conditions of minimum quiescent currents and maximum power transfer to the load.

Briefly, the present invention relates to a magnetic amplifier circuit for controlling the energization of a load wherein a high impedance is selectively connected into and effectively disconnected from the circuits for the energizing and quiescent currents. During quiescent operation, the power loss is maintained at an absolute minimum and during periods that the load is energized a maximum power transfer to the load is accomplished. A switch means serves to effectively connect and disconnect the high impedance from the circuits by completing a low impedance path connected in shunting relation with respect to the high impedance. The switch means is actuated in response to the energization of the load when a control signal is supplied to the magnetic amplifiers. The switch means may comprise a transistor which is controlled by a signal indicative of the energized state of the load, for example. Suitable protective circuits are provided for the transistor.

It is the primary or ultimate object of the present invention to provide circuit means for greatly improving the efficiency of operation of magnetic amplifiers.

Another object of the present invention is to provide a magnetic amplifier circuit wherein the quiescent currents are maintained at a minimum value but yet a maximum transfer of power to the load takes place when control signals are impressed on the control windings of the magnetic amplifiers.

Still another object of the invention is to provide a magnetic amplifier circuit wherein high impedance and low impedance paths are effectively switched into the circuits for the quiescent and energizing currents in response to the control of the magnetic amplifiers. In the illustrated embodiment of the invention, a signal is generated upon energization of the load to trigger a transistor which provides a low impedance path in parallel and shunting relation with respect to a quiescent current limiting high impedance.

A further object of the invention is to provide a magnetic amplifier circuit of the character above described which utilizes a minimum number of components, is easily constructed and operates in a highly simplified manner.

The foregoing and other objects, features and advantages of the invention will be apparent from the following more detailed description of a preferred embodiment of the invention, as illustrated in the accompanying drawings.

Figure 2:
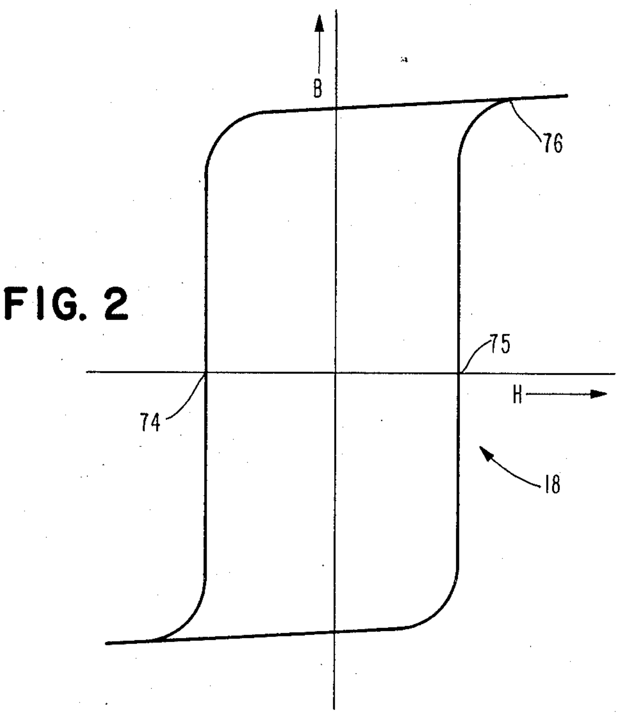
Figure 3:
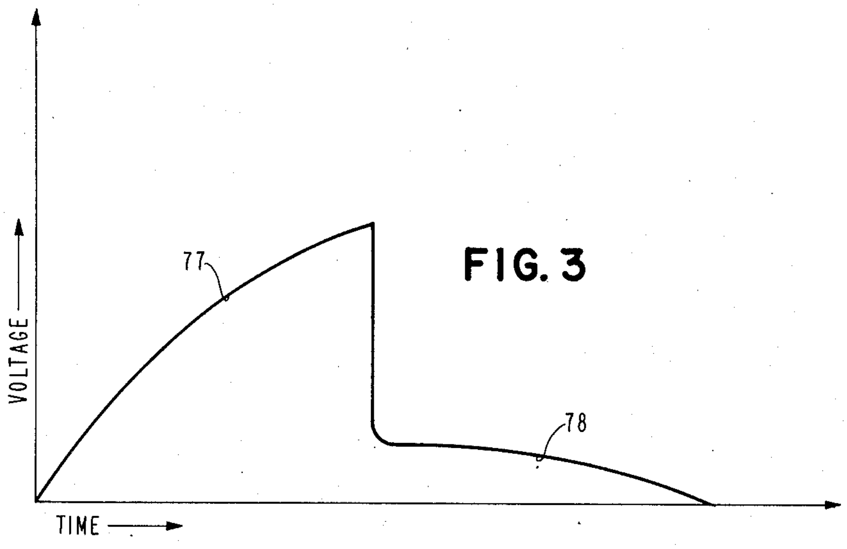

In the drawings:

FIG. 1 is a schematic diagram of a magnetic amplifier circuit constructed and arranged in accordance with the teachings of the present invention;

FIG. 2 is a graph of flux density versus magnetic field strength depicting the hysteresis loop of one of the saturable cores employed in the magnetic amplifier circuit of FIG. 1; and FIG. 3 is a graphical presentation of voltage with respect to time showing the voltage waveform appearing across the gate winding of one of the magnetic amplifiers used in the circuit of FIG. 1 during quiescent operation.

Referring now to the drawings, the reference indicia 10–13 designate generally four magnetic amplifiers. Each of the magnetic amplifiers comprises a core 14 on which are wound a control winding 15, a bias winding 16 and a gate winding 17. The core 14 is fabricated from any suitable magnetic material and may have a hysteresis loop—magnetic flux density plotted with respect to magnetic field strength—as represented at 18 in FIG. 2 of the drawing. However, it should be understood from the outset that the teachings of the present invention are not dependent upon the use of any particular magnetic material.

A source of alternating current supply voltage 20 is connected across the primary 21 of a supply transformer 22 having a center-tapped secondary winding 23. One end terminal 24 of the secondary winding 23 is connected by the conductors 25, 26 and 27 to the gate windings 17 of the magnetic amplifiers 10 and 11. The other end terminal 29 of the secondary winding 23 is connected to the gate windings 17 of the magnetic amplifiers 12 and 13 by the conductors 30, 31 and 32. As will be hereinafter more fully explained, the magnetic amplifiers 10 and 11 are adapted to control the energization of the load during half cycles of one polarity of the supply voltage, while the magnetic amplifiers 12 and 13 control energization of the load during half cycles of the opposite polarity of the supply voltage.

The gate winding 17 of magnetic amplifier 10 is also connected to an end terminal 36 of a center-tapped primary winding 37 of a load transformer 38 by conductor 35 and a rectifier device 34. The gate winding 17 of magnetic amplifier 11 is connected to the other end terminal 39 of the primary winding 37 by a rectifier device 41 and conductor 40. Center taps 42 and 43 of the secondary winding 23 of the supply transformer 22 and the primary winding 37 of the load transformer 38, respectively, are interconected by a circuit 45. The circuit 45 comprises a transistor 49 whose emitter 47 and collector 48 are connected in parallel relation with respect to a resistor 46.

When the end terminal 24 of the secondary winding 23 of supply transformer 22 is positive with respect to the end terminal 29 thereof, current will flow in a circuit including conductors 25 and 27, the gate winding 17 of the magnetic amplifier 10, rectifier device 34, conductor 35, the lower half of the primary winding 37, center tap 43, circuit 45, and the secondary winding 23. Current will also flow in a circuit comprising conductors 25 and 26, the gate winding 17 of the magnetic amplifier 11, rectifier device 41, conductor 40, the upper half of primary winding 37, center tap 43, circuit 45, center tap 42, and secondary winding 23. The currents flowing through the gate windings 17 of the magnetic amplifiers 10 and 11 are conducted through the winding halves of the load transformer primary winding 37 in opposite directions whereby the load is not energized.

The gate winding 17 of the magnetic amplifier 12 is also connected to the end terminal 36 of the primary winding 37 of the load transformer 38 by conductor 35 and rectifier 50. In a similar manner, the gate winding 17 of the magnetic amplifier 13 is connected to the end terminal 39 of transformer winding primary 37 through rectifier device 51 and conductor 40. When the end terminal 29 of the secondary winding 23 of supply transformer 22 is positive with respect to the end terminal 24, currents will flow through the gate windings 17 of magnetic amplifiers 12 and 13 and through the upper and lower halves of the primary winding 37 of the load transformer 38 in opposite directions.

The bias windings 16 of the magnetic amplifiers 10 and 11 each have a rectifier device 52 and a resistor 53 disposed in series relation therewith. These series circuits are connected in parallel relation across the end terminals 29 and 24 of the secondary winding 23 of supply transformer 22 by means of conductors 30 and 54. Thus, when end terminal 29 becomes positive with respect to end terminal 24, current will flow through the bias windings 16 of the magnetic amplifiers 10 and 11.

The bias windings 16 of the magnetic amplifiers 12 and 13 also have rectifier devices 55 and resistors 57 connected in series therewith. These series circuits are arranged in parallel relation and are connected by conductors 30 and 54 across the end terminals 24 and 29 of the secondary winding 23. The various connections are such that current will flow through the bias windings 16 of one pair of magnetic amplifiers during half cycles of one polarity of the supply voltage and will flow through the bias windings 16 of the other pair of magnetic amplifiers during half cycles of the opposite polarity of the supply voltage.

The load transformer 38 has a pair of separate secondary windings 58 and 59. Connected across the secondary winding 58 is a load, such as resistor 60. A rectifier bridge circuit 62 is connected to the output terminals of the secondary winding 59 and provides a direct current voltage which is impressed across the base 66 and emitter 47 of transistor 49 by a circuit comprising conductors 65 and 68 and resistors 67 and 64. A Zener diode 63 is connected between the conductors 65 and 68. The arrangement is such that whenever the transformer secondary winding 58 is energized to develop a voltage across the load resistor 60, the secondary winding 59 will be concurrently energized and a direct current will be supplied by the rectifier bridge 62 to the transistor 49. The transistor 49 is triggered and the same provides a low impedance path between the center-taps 43 and 42 of the primary winding 37 of the load transformer 38 and the secondary winding 23 of the supply transformer 22.

The control windings 15 of the magnetic amplifiers 10 and 11 are wound on their cores 14 in opposite directions with respect to each other. This same relationship is also maintained between the control windings 15 and the cores of the magnetic amplifiers 12 and 13. The control windings 15 of the magnetic amplifiers 10–13 are connected in series relation between terminals 70 and 71 by a conductor 72. A suitable control circuit, not shown, is adapted to be connected across the terminals 70 and 71 for supplying control signals to these control windings.

Referring now to FIGS. 2 and 3 of the drawing, it will be assumed that a magnetic core having a hysteresis loop 18 is initially set at the point indicated by the reference numeral 74. As a positive half cycle of supply voltage is applied to the gate winding, the magnetic core will shift to point 75 on the hysteresis loop and begin to rise to the point 76. During this period of time, the core is unsaturated and, therefore, presents a very high impedance to the flow of current in the gate winding. However, a small magnetizing current does flow. A large voltage drop takes place across the gate winding as represented at 77 in FIG. 3 of the drawing due to the high impedance of the gate winding at this time. When the point 76 is reached, the core is saturated and the core now presents a very low impedance to the flow of current in the gate winding. The gate winding will appear as a low impedance until the supply voltage swings negative. This low impedance state causes relatively large currents to flow through the gate winding. A low voltage drop occurs at this time due to the low impedance of the gate winding as represented by the portion 78 of the graph in FIG. 3.

A biasing pulse is applied to the bias winding of the magnetic core during the negative half cycle of the supply voltage for resetting the core to the point 74 on the hysteresis loop. The time at which the core saturates during a positive half cycle of supply voltage is determined by the initial setting of the core. The control signal is employed to vary this initial setting whereby, depending upon the magnitude and polarity of the control signal, the core will saturate either earlier or later in the positive half cycle of supply voltage with respect to the time of saturation when only the bias signal is employed to determine the initial setting of the core. From the above discussion, it will be seen that a magnetic amplifier connected and operated as described may be considered analogous to a thyratron discharge device having phase shift control.

Considering now the operation of the circuit shown in FIG. 1, it will be assumed that initially a control signal is not impressed on the control windings 15 of the magnetic amplifiers. As the end terminal 24 of the supply transformer secondary 23 becomes positive, magnetizing currents will flow in the gate windings 17 of magnetic amplifiers 10 and 11 in opposite directions through the upper and lower halves of the load transformer primary winding 37, through the resistor 46 and to the center tap 42 of the supply transformer secondary winding 23. At this time, the cores 14 of the magnetic amplifiers 10 and 11 are unsaturated whereby the gate windings 17 thereof appear as very large impedances. As a result, the values of the magnetizing current are quite small.

When the positive half cycle of the supply voltage reaches its maximum, the cores 14 of magnetic amplifiers 10 and 11 will be saturated whereby the gate windings 17 now appear as low impedances. Quiescent currents will flow in opposite directions through the upper and lower halves of the load transformer primary winding 37 and through resistor 46. The magnitude of resistor 46 is selected to provide a very high impedance in order that the values of the quiescent currents may be reduced to a minimum. The value of resistor 46 is limited only by the necessity of permitting magnetizing currents to flow in the gate windings of the magnetic amplifiers and the primary winding of load transformer 38 when the cores 14 are unsaturated. Quiescent currents of a very low value will continue to flow until the supply voltage swings negative with respect to the gate windings 17 of magnetic amplifiers 10 and 11. During this period of time, the load resistor 60 will not be energized since the cores 14 of magnetic amplifiers 10 and 11 saturate at the same instant and equal currents are flowing in opposite directions through the load transformer primary winding 37.

As the supply voltage swings negative, end terminal 29 of supply transformer secondary winding 23 will become positive with respect to end terminal 24 and magnetizing currents will flow through the gate windings 17 of magnetic amplifiers 12 and 13 in opposite directions through the load transformer primary winding 37 and through the resistor 46. When the maximum is reached in the negative half cycle, the cores 14 of magnetic amplifiers 12 and 13 will saturate simultaneously and quiescent currents will flow. These quiescent currents are limited to a minimum value by the high impedance of resistor 46. During negative half cycles of the supply voltage, the bias windings 16 of magnetic amplifiers 10 and 11 will be energized to reset the cores 14 of these magnetic amplifiers to their initial settings. The cores of magnetic amplifiers 12 and 13 are reset by current flowing in the bias windings 16 thereof during positive half cycles of the supply voltage.

If now a control signal of sufficient magnitude is impressed across the terminals 70 and 71, then the core of one magnetic amplifier of the pair 10—11 will saturate a predetermined time prior to the saturation of the core of the other magnetic amplifier of the pair, and the core of one magnetic amplifier of the pair 12—13 will saturate prior to the saturation of the core of the other magnetic amplifier of this pair. Early saturation of a core of a magnetic amplifier of either pair thereof will cause effectively only one current to flow in the primary winding 37 of load transformer 38. A voltage is developed across the secondary winding 58 and the load resistor 60 is energized.

Simultaneously with the energization of the load resistor 60, a voltage appears across the terminals of the secondary winding 59. The output of rectifier bridge 62 is impressed between the base 66 and emitter 47 of transistor 49. The Zener diode 63 and the resistors 64 and 67 protect the transistor from excessive currents and voltages.

The transistor 49 is rendered conductive by the signal supplied across its emitter and base so that the same provides a very low impedance path in parallel with the resistor 46. When not conducting, the transistor appears as a high impedance whereby the currents flowing during quiescent operation pass through resistor 46. When the load is energized the impedance thereof is reflected through the load transformer 38 into the current circuit comprising the gate winding of the saturated magnetic amplifier and the conducting transistor 49. Since the transistor 49 effectively shunts the resistor 46 at this time, a maximum power transfer between the source of supply voltage and the load is accomplished.

When both of the cores of either pair of the magnetic amplifiers are saturated at the same time during a half cycle of the supply voltage, the load will not be energized. Similarly, no voltage will appear across the output terminals of the rectifier bridge. The transistor 49 will be rendered non-conductive and quiescent currents will be caused to flow through the high impedance resistor 46.

It should now be apparent that the objects initially set forth have been accomplished. Of particular importance is the provision of a simplified magnetic amplifier circuit wherein the quiescent and magnetizing currents are reduced to a minimum and maximum power transfer to the load is provided. The efficiency of magnetic amplifier circuits is greatly increased and/or the size of the magnetic amplifiers required for a given application may be reduced. This allows magnetic amplifier circuits to be employed where the same could not previously be advantageously used.

While the teachings of the invention have been described in connection with a magnetic amplifier circuit of the push-pull type, it should be understood that the same may be employed with many other magnetic amplifier circuits. Also, the control means for actuating the means for shunting the high impedance may be responsive to the flow of control current to the control windings of the magnetic amplifier, the saturation of the cores of the magnetic amplifiers or the flow of load currents in the primary of the load transformer.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A magnetic amplifier circuit for controlling the energization of a load comprising a pair of core members, a gate winding and a control winding on each of said core members, a source of supply voltage, a load transformer having a center-tapped primary, each gate winding having a pair of terminals, one set of terminals of the gate windings being connected to said source of supply voltage, the other terminal of one gate winding being connected to one end terminal of said primary, the other terminal of the other gate winding being connected to the other end terminal of said primary, circuit means interconnecting the center tap of said primary and said source of supply voltage, said circuit means comprising a high impedance path, and means to selectively shunt said high impedance path and providing a low impedance path.

2. Apparatus according to claim 1 further characterized in that said high impedance path has an impedance value sufficient to prevent the flow of large quiescent currents while yet permitting the flow of magnetizing currents for said core members.

3. Apparatus according to claim 1 further comprising control means for said means to selectively shunt, said load transformer having a secondary, a load connected to said secondary, and said control means being responsive to the energization of said load.

4. Apparatus according to claim 3 further characterized in that said means to selectively shunt comprises a transistor having a pair of terminals and a base, said pair of terminals being connected in parallel with respect to said high impedance path, and said control means controlling the energization of said transistor.

5. Apparatus according to claim 4 further characterized in that said control means comprises a second secondary of said load transformer, a rectifier bridge connected across said second secondary, and circuit means connecting the output of said rectifier bridge across said base and one of said pair of terminals of said transistor.

6. A magnetic amplifier circuit comprising at least one core member, a gate winding having a pair of terminals on said core member, a control winding on said core member, a source of supply voltage, a load means, said source of supply voltage being connected to one terminal of said gate winding, said load means being connected to the other terminal of said gate winding, circuit means interconnecting said source of supply voltage and said load means, said circuit means comprising a high impedance path, a low impedance path, means for selectively rendering effective said high impedance path and said low impedance path, and control means for actuating said means for selectively rendering effective.

7. Apparatus according to claim 6 further characterized in that said control means is responsive to the energization of said load means.

8. A magnetic amplifier circuit comprising at least one core member, a gate winding and a control winding on said core, circuit means comprising a high impedance path, a source of supply voltage, a load means, means electrically connecting said gate winding, said load means, said source of supply voltage and said circuit means, shunting means for selectively shunting said high impedance path, and control means for actuating said shunting means.

9. Apparatus according to claim 8 further characterized in that said control means is responsive to the energization of said load means.

10. Apparatus according to claim 8 further characterized in that said shunting means comprises switch means connected in parallel with said high impedance path.

11. Apparatus according to claim 10 further characterized in that said switch means comprises a transistor having a base and a pair of terminals, said pair of terminals being connected in parallel with said high impedance path, and said control means comprising an energizing circuit connected between said base and one of said pair of terminals.

12. An electrical circuit comprising at least one device having a pair of output terminals which in one state of said device appear as a high impedance element and which in another state of said device appear as a low impedance element, means to control the state of said device, a source of supply voltage connected to one of said output terminals, a load means connected to the other of said output terminals, circuit means interconnecting said load means and said source of supply voltage, said circuit means comprising a high impedance path, a low impedance path connected in parallel with said high impedance path, and means for selectively rendering effective said high impedance path and said low impedance path.

13. A magnetic amplifier circuit for controlling the energization of a load comprising a pair of magnetic amplifiers, each of said magnetic amplifiers having a core, a control winding, a bias winding and a gate winding, a supply transformer having a primary winding and a center-tapped secondary winding, a load transformer having a center-tapped primary winding and a secondary winding, circuit means interconnecting the center taps of said secondary winding of said supply transformer and said primray winding of said load transformer, a source of alternating current supply voltage connected to said primary winding of said supply transformer, the gate winding of one of said magnetic amplifiers being connected between one end terminal of said secondary winding of said supply transformer and one end terminal of said primary winding of said load transformer, the gate winding of the other of said magnetic amplifiers being connected between the other end terminal of said secondary winding of said supply transformer and the other end terminal of said primary winding of said load transformer, the bias windings of said magnetic amplifiers being connected in parallel across the end terminals of said secondary winding of said supply transformer, rectifier means enabling current flow through said gate windings only during half cycles of one polarity of said supply voltage, a source of control potential, said control windings of said magnetic amplifiers being connected with said source of control potential in a manner to vary the impedance of said magnetic amplifiers in response to control signals from said source of control potential to permit the core of one of said magnetic amplifiers to be saturated for longer portions of half cycles of one polarity of said supply voltage while the core of said other of said magnetic amplifiers is saturated for shorter portions of half cycles of said one polarity of said supply voltage, said circuit means comprising a high impedance path, a low impedance path, and means for selectively rendering effective said high impedance path and said low impedance path.

14. An electrical circuit for controlling the energization of a load comprising a pair of electrical control elements each having a pair of output terminals, means to control the states of said control elements, each of said control elements appearing as a high impedance element in one state and a low impedance element in another state, a source of electrical energy connected to one of the output terminals of each of said control elements, a load means having terminals connected to the other of the output terminals of each of said control elements, circuit means interconnecting said source of electrical energy and said load means, said circuit means comprising an impedance means, and means to change the effective impedance of said impedance means from a high value when said control elements have the same impedance states to a low value when said control elements have different impedance states.

15. Apparatus according to claim 14 further characterized by said load means comprising a center-tapped electrical element, said source of electrical energy comprising a second center-tapped electrical element, and said circuit means interconnecting the center taps of said center-tapped electrical elements.

16. Apparatus according to claim 14 further characterized by means to control said means to change in response to the energized state of said load means.

17. An electrical circuit for controlling the energization of a load comprising a pair of electrical control elements each having a pair of output terminals, means to control the states of said control elements, each of said control elements appearing as a high impedance element in one state and a low impedance element in another state, a source of electrical energy connected to one of the output terminals of each of said control elements, a load means having terminals connected to the other of the output terminals of each of said control elements, circuit means interconnecting said source of electrical energy and said load means, said circuit means comprising an impedance means, and means to change the effective impedance of said impedance means in accordance with the energization of said load means.

18. An electrical circuit for controlling the energization of a load comprising an electrical control element having a pair of output terminals, means to control the state of said electrical control element, said electrical control element having a pair of stable states and appearing as a high impedance in one state and a low impedance in another state, a source of electrical energy connected to one of said output terminals, a load means connected to the other of said output terminals, circuit means connecting said load means and source of electrical energy, said circuit means comprising an impedance means, and means to change the effective impedance of said impedance means from a high value when said load means is de-energized and during at least a portion of the time said control element appears as a high impedance element to minimize current flow through said circuit means to a low value when said load means is energized during at least a portion of the time when said control means appears as a low impedance element to maximize electrical energy transfer from said source of electrical energy to said load means.

19. An electrical circuit for controlling the energization of a load comprising an electrical control element having a pair of output terminals, means to control the state of said electrical control element, said electrical control element having a pair of stable states and appearing as a high impedance in one state and a low impedance in another state, a source of electrical energy connected to one of said output terminals, a load means connected to the other of said output terminals, circuit means connecting said load means and source of electrical energy, said circuit means comprising an impedance means, and means to change the effective impedance of said impedance means from a high value when said load is de-energized to minimize current flow through said circuit to a low value when said load is energized to maximize electrical energy transfer from said source of electrical energy to said load means.

References Cited in the file of this patent

UNITED STATES PATENTS

| | | |
|---|---|---|
| 2,733,307 | Ogle | Jan. 31, 1956 |
| 2,773,132 | Bright | Dec. 4, 1956 |
| 2,916,689 | Selin | Dec. 8, 1959 |
| 2,967,991 | Deuitch | Jan. 10, 1961 |